Aug. 31, 1954 A. C. PETERSON 2,687,779
COMBINED PROPULSION AND ROTARY WING
SUSTENTATION UNIT FOR AIRCRAFT
Filed Jan. 31, 1949 3 Sheets-Sheet 3

INVENTOR.
Adolph Peterson

Patented Aug. 31, 1954

2,687,779

UNITED STATES PATENT OFFICE 2,687,779

COMBINED PROPULSION AND ROTARY WING SUSTENTATION UNIT FOR AIR-CRAFT

Adolphe C. Peterson, Edina, Minn.

Application January 31, 1949, Serial No. 73,676

9 Claims. (Cl. 170—135.71)

My invention relates to air-craft and especially to an improved means for the propulsion and sustentation of air-craft, especially the lighter than air type, wherefore my invention is called: combined propulsion and sustentation unit for air-craft.

The principal objects of my invention are to provide an improved means adapted for propulsion and especially for supplemental sustentation of air-craft, in conjunction with other means, and to provide such a means in a form which shall have advantages such as, greater safety in use, greater reliability in use, greater safety in landing operations and take-off operations, and in general less susceptibility to injury and fatal accident to occupants of such an air-craft equipped with my means. A chief object is in conjunction with said advantages to provide a means of sustentation and propulsion which shall permit the air-craft to be proportioned for greater speed in flight and efficiency in high speed flight without a sacrifice of safety in take-off and landing. An object is especially to provide a form of air-craft which shall permit great variation in the speed of movement of the air-craft so that while the craft is not inefficient in use, it may still be safe in use in conditions involving fog, clouds, darkness, mountains, hazardous ground conditions, and generally difficult flight conditions and areas, so as to generally decrease the danger from emergency conditions and landng. An object is to provide improved detailed and specific propulsion means and specific sustentation means, and to provide propulsion means having the specific advantage of ability to propel an air-craft and lift in the manner of jet propelled means and in the manner of rotary air-foil means. Generally the object is to provide apparatus having advantages such as above set out.

The principal devices and combinations of devices comprising my invention are as hereinafter described and as set out in the claims.

In the accompanying drawings which illustrate my invention, like characters refer to like parts throughout the several views. Referring to the drawings:

Figure 7 is a detailed view of the gas flow control valve of Figures 1 and 2, this detail view showing the valve as looking from the left of Figures 1 and 2.

Figure 8 is a detail diagrammatic sketch showing the common fuel delivery means for injection nozzles of one unit as shown in Figures 1 and 2, that is as related to one propulsion and sustentation unit.

Figure 10 is a view of the same air-craft looking from the side thereof, while Fig. 9 is a plan view thereof.

Figures 6 and 7 are on a scale approximately one-half that of Figures 1, 2, 3, 4, 5, while Fig. 8 is merely such a scale as will diagrammatically show the relation of the fuel supply to nozzles.

Referring first to Figures 1 to 8 both inclusive, which show one unit only, there is here shown a primary compressor and turbine composed of axial flow compressor A and gas turbine B; a rotary sustentation air-foil generally designated as C; a supplemental turbine D which may drive the rotary air-foil C; a supplemental combustion chamber E which may supply additional combustion to supplemental turbine D and utilizes gases and air from the primary turbine; a supplemental jet combustion chamber F which utilizes gases and air from the primary turbine and adds additional combustion according to the will of the operator or pilot, and the need for additional propulsion power; and a jet exhaust conduit G. These are in general the principal operating parts of my device.

Figures 1, 3:
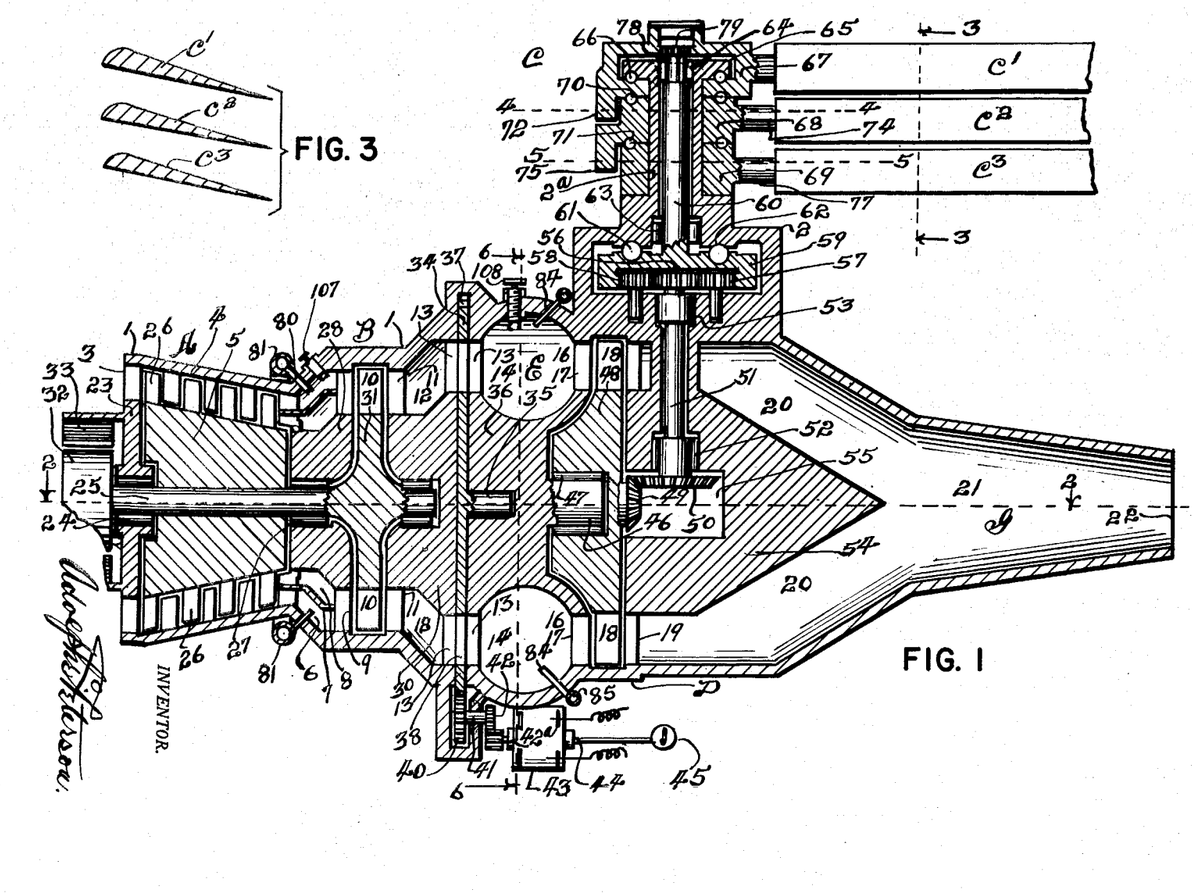
Figure 1 is a section on a plane passing vertically through the axes of the chief component operating elements of my device, this section being on the lines 1—1 of Figures 2, 4, 5, 6, 7, of detailed figures illustrating one of my units, and on the line 1—1 of one of the units as embodied in an air-craft shown in Figure 9, some parts being in full side elevation, and some parts being broken away.
Figure 3 is a detail sectional view of the three blades or air-foils of one unit, this section being on the line 3—3 of Figure 1 and showing the relative positions of the blades as they are in Figure 1, that is in their trailing positions.

A casing 1 generally encloses the power producing elements of my device and forms therein the various chambers as hereafter described forming the chambers wherein the operational parts operate to produce power for propulsion. This casing 1 may be formed of steel or any alloy or even a combination of metal and a strong ceramic material should that be deemed advisable, and it is sufficiently strong so that it may support the so-called pylon 2 which may be formed integrally with the casing 1 or otherwise formed and securely united to it substantially in the position shown.

The casing 1 at its forward end is open to the atmosphere by intake openings 3 and immediately there behind forms a compressor chamber 4 of annular form around a compressor rotor 5 and immediately rearward of the compressor chamber 4 forms an annular combustion chamber 6 specifically designated primary combustion chamber this being between the wall of casing 1 and an annular interior wall 7 within which there is an annular air chamber 8. Rearward of the latter annular chambers there is an annular space wherein are fixed guide nozzles or stator blades 9. Rearward of the latter space there is an annular space wherein primary turbine blades 10 move. Rearward of the latter space there is an annular space wherein are fixed stator guide blades 11 and rearward thereof there is an annular flow chamber 12 which delivers through two diametrically oppositely located ports 13 (as permitted by the valve hereafter described) into a pair of combustion chambers 14, or into two separate and distinct combustion chambers 15 (as permitted by said valve hereafter described), by ports 39.

Rearward of the combustion chambers 14 and 15 there is an annular nozzle space 16 which passes the gases from the combustion chambers 14 (when gases flow) through guide nozzles as formed by an annular set of guide blades 17, through an annular space occupied by supplemental turbine blades 18 of supplemental turbine D. Rearward of the latter space there is an annular space occupied by annular set of reaction guide blades or stator blades 19 of the supplemental turbine D. Rearward of the latter there is a conical annular discharge space 20 which delivers into the jet conduit space 21 of cylindrical form which constitutes the jet exhaust conduit G. The latter discharge conduit is open to the atmosphere rearwardly of the device at the open port 22. The jet exhaust conduit G is constructed in such form and length as will most efficiently aid in producing the jet propulsion power.

At the forward end of the casing 1 there is a fixture 23 in which are formed the intake openings 3 and a roller bearing 24 in which the forward end of the primary turbine shaft 25 is rotatably mounted. Immediately rearward of this bearing there is fixed on this shaft compressor rotor 5 having axial flow air compressor blades 26 fixed in annular stages on the rotor, as shown. Rearwardly of the compressor rotor roller bearing 27 is formed in the stator fixture 28 and at the extreme rearward end of the shaft 25 there is a roller bearing 29 formed in the stator fixture 30 on the rearward side of the turbine rotor space. Between the last two named roller bearings there is formed on the primary turbine shaft 25 the primary turbine rotor 31 which carries annularly thereof the primary turbine blades 10 which revolve with the turbine rotor in the space designated above. This primary turbine shaft 25 with its compressor rotor 5 and turbine rotor 31 revolve independently of the other rotating parts hereafter described with the exception that there is an electric motor armature at its extreme forward end, designated 32, which is within motor field electro-magnets 33 and forms a starting motor, or a motor-generator, as may be desired.

Figures 2, 4, 5, 6:
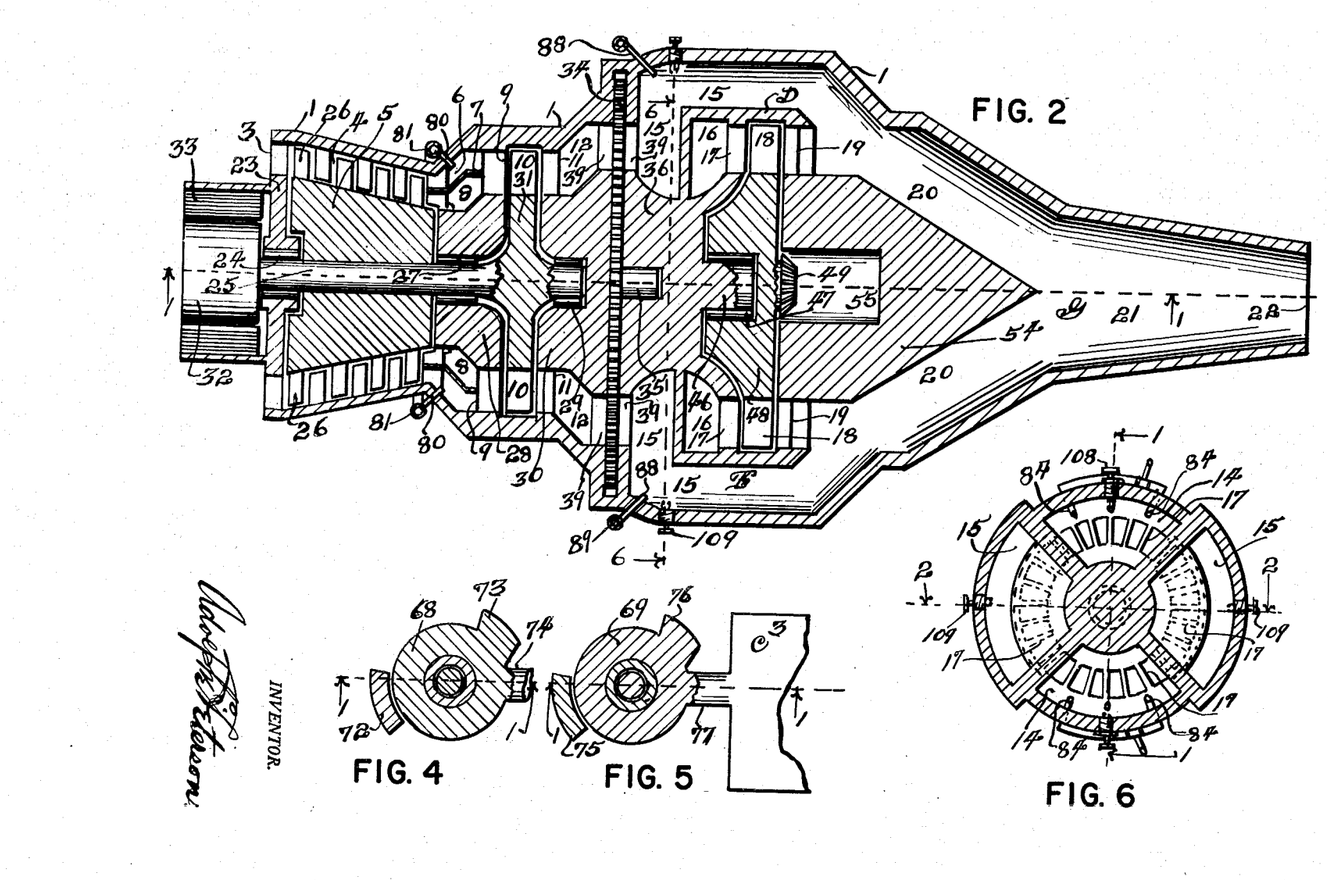
Figure 2 is a section on a plane passing horizontally through the axes of some of the principal operating elements of my device, this section being on the lines 2—2 of Figures 1, 6, 7, and on the line 2—2 of one of the units as embodied in the air-craft shown in Figure 10, some parts being shown in full plan view.
Figure 4 is a detailed sectional view, on the line 4—4 of Figure 1, showing part of the blade operational control means.
Figure 5 is a detailed sectional view, on the line 5—5 of Figure 1, showing another part of the blade operational control means.
Figure 6 is a transverse section on a plane passing transversely of the unit as shown in Figures 1 and 2, this section being on the lines 6—6 of Figures 1 and 2, some parts being shown in elevation behind the plane of the figure, and some parts being broken away.

Rearward of the primary shaft 25 on the same axis extended, there is rotatable in an axially shallow space formed in casing 1, a disk-shaped control valve 34 which may otherwise be called a gas-air control valve. This valve 34 at its axial center has fixed thereto a shaft 35 which is rotatable in a bearing formed in the fixture 36 formed within casing 1 centrally thereof and fixed to casing 1. The valve 34 has formed on its periphery teeth 37 forming a spur gear also designated 37. This valve 34 has a pair of ports 38 formed diametrically oppositely in it and visible in Figures 1 and 7. These ports 38 are large in transverse area and so formed that they will in one position, that shown in Figures 1 and 2, be aligned with ports 13 (see Figures 1 and 6) and will in another position, advanced 90 degrees of the valve position, be aligned with the ports 39 delivering into combustion chambers 15 (Figures 2 and 6). The valve 34 is for control rotated or oscillated into either position of alignment, by means of the small spur gear 40 on shaft 41 and fixed with spur gear 42 so that the electric motor 43 may rotate spur gear 42ª and thereby the spur gear 37 on valve 34, according to the flow of electric current in the motor 43, which may be arranged to give either forward and reverse movement to its armature or only forward movement. In either case the pilot may position valve 34 for either position of port alignment by means of the electric motor 43. The latter may have its shaft 44 in engagement with an indicating means generally illustrated as 45 by which the pilot may be able to know the position the valve occupies and station the valve as he wishes. The indicating means 45 may be of any type as commonly used as an indicating means and which would station its indicator needle or pointer according to the position occupied by valve 34. Any other means may be used for positioning valve 34.

Rearward of valve 34 there is formed and fixed on fixture 36 an axially located static spindle 46 on which there is mounted roller bearing 47 and directly on the latter the supplemental turbine rotor 48 which bears supplemental turbine blades 18 and forms turbine D. The supplemental turbine rotor 48 has fixed on its rearward face axially thereof the small mitre gear 49. The latter is in engagement permanently with the larger mitre gear 50 and the latter is fixed on the lower end of the drive shaft 51 which is mounted in bearings 52 and 53 in the static fixture 54 which is a cone shaped fixture centrally of conical annular discharge space 20, there being formed within it the space 55 within which mitre gears 49—50 operate.

At the upper end of drive shaft 51 there is fixed a small spur gear 56 which through small planetary gears 57 drive at a reduced speed the internal spur gear 58 formed within drum 59. The drum 59 is on the lower end of air-foil drive shaft 60 and is fixed securely thereon or formed integrally with it. The drum 59 by means of ball or roller bearing 61 is secured to impart upward vertical thrust from air-foil drive shaft 60 to the bearing face 62 which is formed as a firm part of the pylon 2 so that upward vertical thrust may be imparted to the pylon 2 and thereby to casing 1 and thereby to the air-craft structure to which the casing 1 may be secured. The air-foil drive shaft 60 is rotatable in roller bearings 63 and 64 which are fixed in pylon 2 and in the upward extension $2^a$ thereof. The latter is a sleeve shaft firmly fixed on pylon 2 and is static and bears on its extreme upper end the latterally extending flange or drum 65 of cylindrical form and which forms a firm connection through sleeve shaft $2^a$ with pylon 2, so that through ball or roller bearing 66 the air-foil rotor may impart its upward vertical sustentation thrust to the pylon 2.

The air-foil rotor, designated C, generally, is composed of three independently or partially independently movable blades $C^1$, $C^2$, and $C^3$ which are fixed respectively on independent hubs 67, 68, 69. The independent or separate hub 67 is the upper one, the hub 68 an intermediate one placed just below hub 67, and the hub 69 is a lower hub placed just below hub 68, all of the three hubs being rotatably mounted outside of sleeve shaft $2^a$ on the same axial axis. The upper hub 67 bears upwardly against roller bearing 66; the intermediate hub 68 bears upwardly against hub 67 through a roller bearing 70; the lower hub 69 bears upwardly against hub 68 through roller bearing 71 and thereby bears through hub 68 against the upper hub 67 and thereby against the drum 65 and thereby imparts upward thrust against sleeve shaft $2^a$ of pylon 2. Thus the three hubs 67, 68, 69, with their three blades or air-foils, as described may impart upward thrust against sleeve shaft $2^a$ and pylon 2 but at the same time each of these three hubs with its blade is free to oscillate on shaft $2^a$, as a bearing, through a sector of a circle relatively to the immediately adjacent hub, which is approximately one-third of the circle, so as to permit of the function hereafter described.

The hub 68 is limited in its movement or oscillation relative to hub 67 by means of a an arc-like lug 72 which is formed as a part of and integrally with hub 67 and depends therefrom exteriorly of the side of hub 68 and is formed and placed to abut in rotation in the normal direction of rotation of the air-foil rotor, against the laterally projecting lug 73 which is formed as a part of and integrally with hub 68. In the opposite direction of movement of hub 68 relatively, the lug 72 of hub 67 would abut against the connecting rod 74 of blade $C^2$. The hub 69 is limited in its movement relatively to hub 68 by means of an arc-like lug 75 which is formed as a part of and integrally with hub 68 and depends therefrom exteriorly of the side of hub 69 and is formed and placed to abut in rotation in the normal direction of rotation of the air-foil rotor, against the laterally projecting lug 76 which is formed as a part of and integrally with hub 69. In the opposite direction of movement of hub 68 relatively, the lug 75 of hub 68 would abut against the connecting rod 77 of blade $C^3$. Thus the movement of hubs 68 and 69 with their blades is limited with respect to the movement of hub 67 or the latters position, so that at any time, for a normal position, the hubs 68-69 with their blades may take a position with respect to hub 67, so that blades $C^1$, $C^2$, $C^3$, are parallel and trail together rearwardly of their axial centers of rotation, and in the positions as shown in Figures 1, 3, 9, 10. For driving movement or sustentation actuation, the hub 67 may rotate until lug 72 contacts lug 73 of hub 68, whereupon hub 68 is engaged with hub 67 to be driven therewith, and hub 68 may advance with respect to hub 69 until lug 75 contacts lug 76 of hub 69, and thereupon hubs 67, 68, 69 are engaged so that driving force rotates hub 67 and through it hub 68 and through it hub 69.

The hub 67 has formed in its upper smaller part an internal spur gear 78 with which a spur gear 79 is engaged permanently. The spur gear 79 is fixed on the extreme upper end of the air-foil drive shaft 60, Fig. 1, and constitutes a permanent engagement of hub 67 for driving by shaft 60 and thereby by the driving means as above described connecting with supplemental turbine rotor 48.

Figures 7, 8, 10:
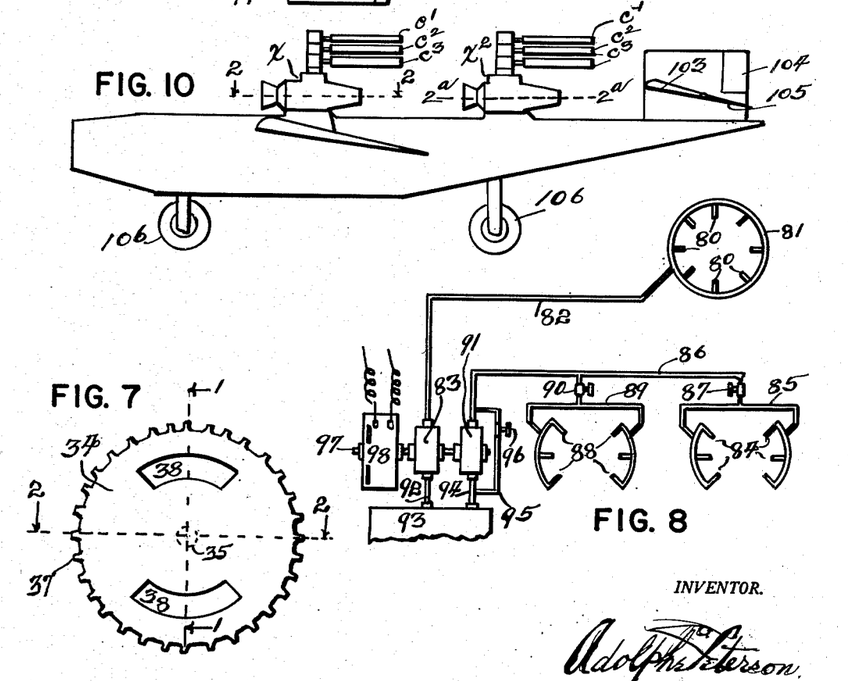

In the annular primary combustion chamber 6 there are projected fuel injection nozzles 80 and these are connected with to receive fuel from annular conduit 81 and thereby by conduit 82 from primary fuel pump 83. In the arc-like combustion chambers 14 there are projected six fuel injection nozzles 84 which receive fuel from conduit 85 and thereby from a common conduit 86 as controlled by hand valve 87. In the arc-like combustion chambers 15, there are projected fuel injection nozzles 88 which receive fuel from conduit 89 and thereby from common conduit 86 as controlled by hand valve 90. The common conduit 86 receives fuel as pumped by pump 91. The pump 83 receives fuel by supply conduit 92 from reservoir 93. The fuel pump 91 receives fuel from supply conduit 94 and thereby from reservoir 93, but this fuel pump 91 is controlled in its discharge by means of a by-pass 95 which permits return of fuel to reservoir 93 as permitted by hand valve or by-pass valve 96. The fuel pumps 83 and 91 are each operated by shaft 97 and the latter is operated by electric motor 98 and subject to control of the pilot by variation of the electric current passing to electric motor 98 by any means. Electric motor 98 with its controls, as commonly used, is a variable speed motor.

Figure 9:
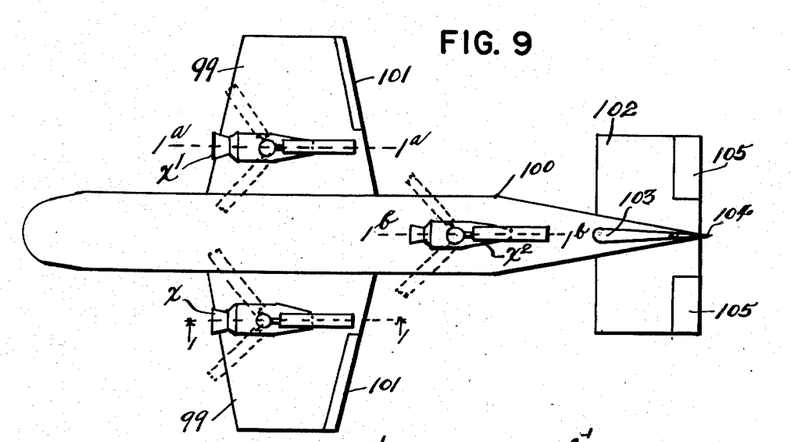
Figure 9 is a view in much reduced scale of an air-craft embodying in its construction three of my propulsion and sustentation units, as illustrated in Figures 1 to 8 both inclusive,, these units being shown only diagrammatically in Figures 9 and 10.

In use the units illustrated and above described, may be mounted in any number on an air-craft and in any locations thereon, as found suitable. One form of mounting is shown in Figures 9–10, wherein three such units as described, designated X, $X^1$, $X^2$, respectively, are fixed on the air-craft, each having its separate fuel supply as above described. One is shown fixed on each wing 99; one is shown mounted on the rearward part of the fuselage 100. The wings have ailerons 101 which may be of the usual form for control of the air-craft in flight. The fuselage has on its extreme rear end horizontal stabilizer wing 102, vertical stabilizer 103, vertical rudder 104, horizontal rudder 105. The fuselage has landing wheels 106 which may be of any retractable form as commonly used.

Having described in detail my device, the operation is now generally described. It should be observed that the air-foil rotor consisting of air-foil blades $C^1$, $C^2$, $C^3$, (of each unit) is so mounted on the air-craft that the blades are free to revolve in a horizontal plane above the location on the air-craft. It should be observed also that the wings 99 are such as will in normal high speed flight or travel of the air-craft give the necessary sustentation or climbing effect to the air-craft, without any assistance from the rotary air-foil unit C of each unit X, X¹ or X², although there may be some assistance in flight from the stabilizer wing 102. Likewise it should be noted that the normal controls are such as will serve to control the air-craft in flight for climbing or descending effect, and for horizontal directional effect and such balancing of the air-craft as is necessary may be effected by these elements and the ailerons 101 or any other means as commonly used in air-craft. And such control of the air-craft in flight may also be aided by the control of the propulsion effect of the several units, as hereafter described.

The control or variation of combustion in the combustion chambers of each unit is effected generally for each unit by its electric motor 98 with its controls for variation of the speed thereof and thereby the pumped volume of fuel per unit of time. This variation of speed of the electric motors 98 of the several units X, X¹, X², will vary the volume of fuel of each pump 83 and 91, although generally the shaft 97 of each fuel unit will be operated at a normal speed for a cruising speed of the air-craft. Each fuel unit, of which one is shown in Fig. 8, may be varied in its fuel volume independently of the others and thereby the power effect in the various units may be independently varied as desired by the operator, although they will generally be controlled to operate at a uniform identical speed and therefore fuel delivery volume. But in any unit fuel may be cut off from either the nozzles 88 or 84 by hand valves 90 and 87, and the volume of fuel delivered to either set of nozzles 88 or 84 may be independently varied by means of by-pass valve 96.

Spark plugs 107 supplied with ignition current by any means provide for ignition in primary combustion chamber 6. Spark plugs 108 provide for ignition in combustion chambers 14, as necessary. Spark plugs 109 provide for ignition in combustion chambers 15 when ignition is necessary. The electric motor 32—33 is supplied with electric current for starting by any source of supply such as an electric storage battery.

In normal flight the rotary air foil blades C¹, C², C³, do not operate, as their blades in normal flight, simply trail backwardly from their hubs 67, 68, 69 and are so kept in the trailing and parallel positions, as shown by full lines in Figures 9 and 10, by the force of the air passing by them. When the air foil means of the units X, X¹, X², are in operation, for sustentation or additional sustentation thereby, the blades of each unit will take the relative positions, as shown by dotted lines in Figure 9, that is, the blades will take the positions in each rotor, such that, blades C¹, C², C³, will have the relative positions to each other of 120 degrees, 240 degrees, and 360 degrees, of the circle about the rotor in the horizontal plane transversely of the axis of the rotor.

Assuming the air-craft is on the ground. The manner of take-off will depend principally on the size of run-way available and the surrounding conditions. The pilot by electric motors 32—33 of the units starts the shafts 25 of all three units in operation, simultaneously or one at a time, as desired. As the shafts 25 reach say one-third to one-half of normal operating speed he starts motors 98 in operation to feed fuel, such as gasoline or fuel oil of any type or alcohol. At this time by-pass valves 96 are open so fuel pumped by pumps 91 is by-passed. The pilot may by motors 43 place gas-air valves 34 in a position suitable for the particular conditions of take off. If there is a long run-way, he may place valves 34 in the position such that ports 38 are aligned with ports 39, so that gas and air from annular chamber 12, that is from the primary turbine, will flow into combustion chambers 15 and thereby into the conical annular chamber 20 and thereby to jet exhaust conduit 21 and port 22 to atmosphere. He may now feed combustion fuel to nozzles 88 feeding chambers 15 by partially or wholly closing by-pass valve 96 and by opening valve 90 (of each unit). There will thus be primary combustion in primary combustion chamber 6 in the primary power turbine, and there will also be additional combustion in the combustion chambers 15, the latter adding to the heat of the gases issuing to jet exhaust 21. Thereby there is full propulsion power (with full fuel flow) to nozzles 80 and nozzles 88, and the air-craft will gain the necessary speed for flight.

Assuming that when the pilot takes off, there is a relatively short run-way or surrounding conditions are unfavorable, the pilot pursues another method instead of that just above outlined. In this case, he starts the primary power turbine by starting shafts 25 and feeding fuel to nozzles 80, as before. But in this case, he places valves 34, of each unit, in the positions, such that gas-air flows from annular conduit or chamber 12, that is from the primary power turbine, to the combustion chambers 14 and annular guide chambers 16 and therefrom to the nozzles or guides 17 to blades 18 of the supplemental turbine rotor 48, and thereby through guides or reaction blades 19 to passage 20 and to jet exhaust 21, and so that in this condition also, gas flow from the primary power turbine to combustion chambers 15 is cut off. At the same time the pilot closes or partially closes by-pass valves 96 and opens valves 87 so that fuel flows through nozzles 84 to combustion chambers 14, whereby there is supplemental combustion in combustion chambers 14 so that gases flowing to the supplemental turbine D are thus additionally heated to produce large power output. The result of this flow of gases to supplemental turbine D, blades 18, is that rotor 48, drive shaft 51, drive shaft 60, hub 67 are started in motion. As hub 67 starts in motion, it moves 120 degrees and abutment or lug 72 contacts abutment or lugs 73 of hub 68; then hub 68 is carried along 120 degrees and abutment or lug 75 contacts abutment or lug 76; then hub 69 is carried along with the other hubs in rotation. When a movement of 240 degrees is achieved by hub 67 there is full contact for propulsion of the hubs as a unit as a rotary air-foil, and this is the condition for full sustentation effect, or such sustentation effect as is produced by the power output of supplemental turbine D.

The pilot may now increase power output to full flow of fuel if that be necessary, and in this condition, there will be large gas-flow through jet conduit 21 and port 22 to atmosphere creating thrust in the direction of forward flight of the air-craft, and the rotor air-foil is rotating at high speed to create a strong lift effect on the casings 1 and thereby on the air-craft so that as the air-craft starts to move forwardly it also receives a strong upward lift from the rotary air-foils of the three units X, X¹, X², and the result is that the air-craft while starting a forward run will immediately lift upward and start an upward climb. Thus the air-craft may in this method take-off with a relatively short run or relatively no run along a run-way. If the aircraft be blocked against forward motion until the rotary air-foils gain full speed, the air-craft may take off in substantially or nearly vertical take off at the start of take off. It will however rapidly gain forward speed in the direction of flight, as there is strong propulsion from the jet exhaust through ports 22 of the units.

Assuming the air-craft is in the air at a height above ground suitable for travel, the pilot may cut-off fuel flow to nozzles 84 by closing valve 87 and may turn valves 34 to positions such that ports 38 are aligned with ports 39 so gases flow to combustion chambers 15 and he may then as he desires, and as necessary for flight, cause fuel to flow to nozzles 88 by opening valve 90 and adjusting valve 96. For full forward speed there would be full delivery of fuel to nozzles 88 as well as nozzles 89. For a slower cruising speed it may be sufficient, according to the construction, to have full fuel flow only to nozzles 80, that is to the primary combustion chamber, and to have no fuel flow to nozzles 88 for supplementary combustion. This would depend much on the nature of the design.

Assuming the pilot desires to land, the method of operation would again depend on surrounding conditions, whether hazardous and whether there is a long run-way. He may in the most favorable conditions, where he may land at high speed, continue the operation as in normal flight, that is with flow of gases through combustion chambers 15 to exhaust jet 21, of each unit. But assuming, there is a short run-way, or that there is fog, or clouds, or high obstructions, the pilot may before descending for landing, cut off the fuel flow to nozzles 88 and the gas-air flow to combustion chambers 15, and cause the gas-air flow from primary combustion chamber and turbine, to flow to combustion chambers 14 and not to chambers 15, and he may cause fuel to flow to nozzles 84 and not to nozzles 88, so that there is combustion at a high rate in combustion chambers 14 and full flow of gases through the supplemental turbine D to jet exhaust conduit 21 and ports 22. The result of this will be (while the air-craft is aloft) that the rotor 48 will revolve, shafts 51 and 60 will start revolving, and hub 67 will, as in take-off, contact hubs 68 and 69 for propulsion, so that the rotary air-foils of each unit X, X¹, X², will rotate at high speed for sustentation effect. The pilot may now as necessary, adjust the flow of fuel to nozzles 84 so as to produce just that degree of power output necessary to produce the rapidity of rotation of the rotary air-foil units that will be necessary to permit the air-craft to gradually descend. He may by the air-crafts horizontal and vertical rudder means 104—105 cause such movement of the air-craft in a circling movement of relatively small radius, as he approaches a landing. Since in this condition, much of the power output is consumed in driving the supplemental turbine D, there will not be as great forward thrust available from the exhaust jet conduit 21, and therefore forward movement of the air-craft will be considerably slower than at normal speed and flight, thereby enabling better selection of landing location. He may facilitate maneuvering by varying power output of the units, as by reducing power output of unit X², to create slowing of the forward movement for alighting. Such slowing would result from an upward tilting of the front end of the fuselage 100.

It is contemplated that for very high speed air-craft, especially, the wings 99 may be made relatively short transversely of the air-craft and that they may be of low sustentation capacity at relatively slow speeds, and that they may be made for most efficient flight at the very high speeds normally suitable for jet propulsion flight, since the units X, X¹, X², will provide the supplemental sustentation that is needed for slow travel, landing, and emergency conditions. This would be especially true, where the air-craft is constructed and intended for use for flight from and to a water-borne craft as a landing area. It is not contemplated that the air-craft will normally land in areas having not even a short run-way, but such a landing will be effected only in extreme emergency conditions, and at such times, every control means of the propulsion and sustentation means, as above described, will be utilized to enable landing substantially or nearly in vertical descent, as by circling or tilting of the air-craft as above described. The method of use of the means will in all conditions depend on the selection by the pilot of the power output of units and the air-craft control by the control elements specified, or any other control means which may be additionally supplied. To enable circling of the air-craft the pilot may vary the output of units X and X¹ to effect quick circling of the air-craft. At any time for landing and take-off operations, the pilot may use ailerons 101 and also rudders 105 and any type of flaps (as commonly used in air-craft) to slow the forward movement, in addition to means above described, for such purpose.

The primary power turbine and compressor A should be proportioned to give the necessary flow of gas and air at sufficiently high pressure so that there may be the necessary drop in pressure through the primary turbine B and thereafter through the supplemental turbine D. There should be as high a proportion of air delivered by the compressor and flowing as air through annular chamber 8 to unite with the gas-flow from combustion chamber 6 in guide nozzles 9, as attainable, in order that there may be a greater proportion of air for combustion in the combustion chambers 14 or 15. Normally in gas turbines, however, there is a large proportion of air to fuel, ranging generally to ten times the volume for combustion, so that there will in a practicable turbine be sufficient air for the supplemental combustion. While I have shown the fuel supply for each unit as powered by an electric motor 98, it is contemplated that the fuel supply to each unit may be powered as is customary in turbines by the turbine shaft, that is shaft 25, although this is not shown. Any type of temperature indicating means as commonly used with turbines may be used for the guidance of the pilot. In various constructions according to my invention, the characteristics of operation may vary according to the design, whether the air-craft is constructed for high or slower speeds, and thus also, the ability for steep inclined descent or vertical descent may vary, some constructions having the ability for almost vertical descent according also to the prevailing wind current at the time of descent. While I have shown the air foil blades as freely movable within the limits with respect to each other as above described, I contemplate that any means for locking or unlocking the blades in any position, at any time, may be used, such means being not included in the design as illustrated, as it is deemed unnecessary for the purpose of use in the preferred manner.

The individual blades may have any means commonly used for rendering their mounting flexible and adjustable. As shown, the torque of drive against the air, coupled with the effect of centrifugal force, will tend to keep the blades in the correct positions for sustentation drive, while air-flow will keep them in the trailing positions for normal travel. Whenever in flight the pilot cuts off fuel flow to nozzles 84 and positions gas and air valves 34 to shut off flow to chamber 14, the supplementary turbine D ceases to deliver driving power to the sustentation rotor C and its blades C1, C2, C3, and these blades then automatically take the parallel trailing positions from the hubs, and the rotor C then has no sustentation effect and the load is carried by the main wings 99.

While I have shown particular devices and combinations of devices, in the illustration of my invention, I contemplate that other detailed devices and combinations of devices may be utilized in the realization of my invention, without departing from the spirit and contemplation thereof.

What I claim is:

1. A supporting structure on an air-craft for a rotary air foil means, the said supporting structure including a static sustentation rotor bearing means mounted to have a substantially vertical axis on the air-craft, air foil means mounted on said rotor bearing means and including a plural number of air foil blades each rotatably mounted by a hub at its root on said rotor bearing means, inter-locking means between said hubs permitting rotation of said air foil blades as a unit and permitting said blades in one phase to assume positions in the circle about said axis substantially parallel to each other and in another phase causing said blades to be rotatively engaged to assume positions as radii of the circle about said axis separated substantially equi-distantly, a primary power turbine and an air compressor driven by said turbine and an air intake for said compressor and an exhaust jet from said power turbine to receive air in said intake and discharge gases from said jet in a direction substantially at right angles of the vertical axis of said rotary air foil means, a supplementary power turbine rotatable independently of the primary power turbine and means adapted to interpose said supplementary power turbine in the flow of gases from said primary power turbine to said exhaust jet, and a driving connection from said supplementary power turbine to said air foil means to rotatively engage said air foil means to move said blades into said equi-distantly separated positions and engaging said air foil means to rotate it as a unit in said circle transversely of said axis.

2. A supporting structure on an air-craft for a rotary air foil means the said supporting structure including a static sustentation rotor bearing means mounted to have a substantially vertical axis on the air-craft, a rotary air foil means rotatively mounted on said rotor bearing means, the said air foil means including a plural number of blades each rotatively mounted by a hub at its root on said rotor bearing means, inter-locking elements between said hubs permitting rotation of said air foil blades as a unit and permitting said blades in one phase to assume positions in the circle about said axis substantially parallel to each other and in another phase causing said blades to be engaged rotatively to assume positions as radii of the circle about said axis substantially equi-distantly separated, a primary power turbine and an air compressor driven by said primary power turbine and an air intake for said compressor, a combustion chamber means receiving air from said compressor and passing gases to said power turbine and means for supply of fuel for combustion to said combustion chamber means, an exhaust jet from said power turbine to discharge gases in a direction substantially at right angles of the axis of said rotary air foil means, a supplementary power turbine rotatable independently of the primary power turbine and means adapted to interpose said supplementary power turbine in the flow of gases from said primary power turbine to said exhaust jet, and a driving connection from said supplementary power turbine to said rotary air foil means to engage said air foil means to force said blades into said equi-distantly separated positions and engaging said air foil means to rotate it with said blades in said circle transversely of said axis.

3. A supporting structure on an air-craft for a rotary air foil means the said supporting structure including a static sustentation rotor bearing means mounted to have a substantially vertical axis on the air-craft, a rotary air foil means rotatively mounted on said rotor bearing means, the said air foil means including a plural number of air foil blades each having a mounting hub at its root on said rotor bearing means, inter-locking elements between said hubs permitting rotation of said air foil blades as a unit and permitting said blades in one phase to assume positions in the circle about said axis substantially parallel to each other and in another phase causing said blades to be relatively engaged to assume positions as radii of the circle about said axis separated substantially equidistantly, a primary power turbine and an air compressor driven by said primary power turbine and an air intake for said compressor, a combustion chamber means receiving air from said compressor and passing gases to said primary power turbine and means for supply of fuel for combustion to said combustion chamber means, a supplementary power turbine rotatable independently of the primary power turbine, a by-pass, an exhaust jet to discharge gases in a direction substantially at right angles of the vertical axis of said rotary air foil means, a means selectively passing gases from said primary power turbine to said supplementary power turbine or to said by-pass, the said by-pass and the said supplementary power turbine having connection with said exhaust jet to discharge therethrough, and a driving connection from said supplementary power turbine to said rotary air foil means to force said blades into said equi-distantly separated positions and engaging said air foil means to rotate it as a unit in said circle transversely of said axis.

4. A supporting structure on an air-craft for a rotary air foil means the said supporting structure including a static sustentation rotor bearing means mounted to have a substantially vertical axis on the air-craft, a rotary air foil means rotatively mounted on said rotor bearing means, the said air foil means including a plural number of air foil blades each having a mounting hub at its root on said rotor bearing means, interlocking elements between said hubs permitting rotation of said air foil blades as a unit and permitting said blades in one phase to assume positions in the circle about said axis substantially parallel to each other and in another phase causing said blades to be engaged relatively to assume positions as radii of the circle about said axis separated substantially equi-distantly, a primary power turbine and an air compressor driven by said primary power turbine and an air intake for said compressor, a combustion chamber means receiving air from said compressor and passing gases to said primary power turbine, means for supply of fuel for combustion to said combustion chamber, means, a supplementary combustion chamber means, a supplementary power turbine rotatable independently of the primary power turbine, a by-pass combustion chamber means, an exhaust jet to discharge gases in a direction substantially at right angles of the vertical axis of said rotary air foil means, a means selectively passing gases from said primary power turbine to said supplementary combustion chamber means or to said by-pass combustion chamber means, means passing gases from said supplementary combustion chamber means to said supplementary power turbine, the said supplementary power turbine and the said by-pass combustion chamber means having connection with said exhaust jet to discharge therethrough, and a driving connection from said supplementary power turbine to said rotary air foil means to force said blades into said equi-distantly separated positions and engaging said air foil means by its hub structure to rotate it as a unit in said circle transversely of said axis.

5. All the means described in claim 4 and supplementary fuel supply means supplying fuel to said supplementary combustion chamber means.

6. All the means described in claim 4 and in combination therewith, supplementary means for supplying fuel to said by-pass combustion chamber means.

7. A supporting structure on an air-craft for a rotary air foil means the said supporting structure including a static sustentation rotor bearing means mounted to have a substantially vertical axis on the air-craft, a rotary air foil means rotatively mounted on said rotor bearing means, the said air foil means including a plural number of air foil blades each having a mounting hub at its root on said rotor bearing means, inter-locking elements between said hubs permitting rotation of said air foil blades as a unit and permitting said blades in one phase to assume positions in the circle about said axis substantially parallel to each other and in another phase causing said blades to be engaged relatively to assume positions as radii of the circle about said axis separated substantially equi-distantly, a primary power turbine and an air compressor driven by said primary power turbine and an air intake for said compressor, a combustion chamber means receiving air from said compressor and passing gases to said primary power turbine and means for supply of fuel for combustion to said combustion chamber means, a supplementary combustion chamber means, a supplementary power turbine rotatable independently of the primary power turbine, a by-pass combustion chamber means, an exhaust jet to discharge gases in a direction substantially at right angles of the vertical axis of said rotary air foil means, a means selectively passing gases from said primary power turbine to said supplementary combustion chamber means or to said by-pass combustion chamber means, means passing gases from said supplementary combustion chamber means to said supplementary power turbine, the said supplementary power turbine and the said by-pass combustion chamber means having connection with said exhaust jet to discharge therethrough, and a driving connection from said supplementary power turbine to said rotary air foil means to move said blades into said equi-distantly separated positions and engaging said air foil means to rotate it as a unit in said circle transversely of the said axis, a supplementary fuel supplying means supplying fuel to said supplementary combustion chamber means, a supplementary fuel supplying means supplying fuel to said by-pass combustion chamber means, and means for control of said supplementary fuel supplies to permit flow from either one to its associated combustion chamber means.

8. A supporting structure on an air-craft for a rotary air foil means the said supporting structure including a static sustentation rotor bearing means mounted to have a substantially vertical axis on the air-craft, a rotary air foil means including a plural number of air foil blades each having a rotatable mounting hub at its root mounted on said rotor bearing means, inter-locking elements between said hubs permitting rotation of said air foil means as a unit and permitting said blades in one phase to assume positions in the circle about said axis substantially parallel to each other and in another phase causing said blades to be relatively engaged to assume positions as radii of the circle about said axis separated substantially equi-distantly, a primary power turbine and an air compressor driven by said primary power turbine and an air intake for said compressor and an exhaust jet for said power turbine to discharge gases in a direction at right angles of the vertical axis of said rotary air foil means, a supplementary power turbine rotatable independently of the primary power turbine and means adapted to interpose said supplementary power turbine in the flow of gases from said primary power turbine to said exhaust jet, a means by-passing gases from said primary power turbine to said exhaust jet, a valve means in one phase permitting flow from said primary power turbine to said supplementary power turbine and in another phase permitting flow from said primary power turbine through said means by-passing gases to said exhaust jet, and a driving connection from said supplementary power turbine to said rotary air foil means to move said blades into said equi-distantly separated positions and engaging said air foil means to rotate it as a unit in said circle transversely of said axis.

9. An air-craft which comprises in combination, a fuselage structure, a static sustentation rotor bearing means mounted to have a vertical axis on the fuselage structure, an aerodynamic foil rotor mounted to have rotation on said rotor bearing means on the vertical axis, an air compressor and an air intake therefor, a primary gas turbine course and a primary gas turbine rotatable in said turbine course and connected to and driving the compressor, a combustion chamber receiving air from the compressor and receiving fuel for combustion from a fuel supply and discharging gases to said primary gas turbine, a secondary turbine course and a secondary turbine rotatable independently of the primary gas turbine and operating in said secondary turbine course and rotatably connected to said rotor to drive it, a divided gas conveying passage means to receive gases from said primary gas turbine, a jet nozzle to discharge gases to atmosphere and receiving gases from said secondary turbine course, a by-pass conduit means delivering to said jet nozzle, a disk valve rotatable on an axis substantially aligned with said primary and secondary turbines and disposed intermediately thereof and intermediately of said primary gas turbine course and said divided conveying passage means the said disk valve having port means to convey in one position of the valve gases from said primary gas turbine course through one part of the divided conveying passage means to said secondary turbine course and in an opposite position to convey gases from said primary gas turbine course through the other part of the divided gas conveying passage means to said by-pass conduit means, and means for control of said disk valve to place it in either of its alternative positions.

References Cited in the file of this patent

UNITED STATES PATENTS

| Number | Name | Date |
|---|---|---|
| 1,461,768 | Wisch et al. | July 17, 1923 |
| 2,008,843 | Smith | July 23, 1935 |
| 2,068,774 | Smith | Jan. 26, 1937 |
| 2,405,777 | Buivid | Aug. 13, 1946 |
| 2,424,769 | Page | July 29, 1947 |
| 2,486,272 | Gazda | Oct. 25, 1949 |
| 2,507,657 | Wiessler | May 16, 1950 |
| 2,518,498 | Schulte | Aug. 15, 1950 |
| 2,526,941 | Fishbein | Oct. 24, 1950 |
| 2,587,649 | Pope | Mar. 4, 1952 |

FOREIGN PATENTS

| Number | Country | Date |
|---|---|---|
| 563,427 | Great Britain | Aug. 15, 1944 |
| 586,572 | Great Britain | Mar. 24, 1947 |
| 583,500 | Great Britain | Dec. 19, 1946 |
| 594,207 | Great Britain | Nov. 5, 1947 |